United States Patent
Miyai et al.

(10) Patent No.: US 7,589,139 B2
(45) Date of Patent: Sep. 15, 2009

(54) POLYVINYLPYRROLIDONE POWDER COMPOSITION AND ITS PRODUCTION PROCESSES

(75) Inventors: Takashi Miyai, Ibaraki (JP); Mitsuru Nakajima, Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 27 days.

(21) Appl. No.: 11/730,910

(22) Filed: Apr. 4, 2007

(65) Prior Publication Data
US 2007/0238818 A1 Oct. 11, 2007

(30) Foreign Application Priority Data
Apr. 5, 2006 (JP) .............................. 2006-104627

(51) Int. Cl.
*C08L 39/06* (2006.01)
*C08K 5/17* (2006.01)

(52) U.S. Cl. ...................... 524/249; 524/186; 524/236; 524/548; 525/326.9; 525/379; 526/213; 526/217; 526/264

(58) Field of Classification Search ................ 526/213, 526/217, 264; 525/326.9, 379; 524/548, 524/186, 236, 249
See application file for complete search history.

(56) References Cited

U.S. PATENT DOCUMENTS 3,674,859 A * 7/1972 Beutel et al. ................. 514/152
4,786,699 A 11/1988 Nuber et al.
6,187,884 B1 2/2001 Kothrade et al.
6,436,440 B1 * 8/2002 Meffert et al. ............... 424/486
6,498,231 B2 * 12/2002 Tomihisa et al. ............ 528/501
6,617,420 B2 * 9/2003 Kuriyama et al. ........... 528/480
2006/0216263 A1 * 9/2006 Miyai et al. .............. 424/70.15
2008/0182955 A1 * 7/2008 Okamura et al. ............ 526/258

FOREIGN PATENT DOCUMENTS

| JP | 62-62804 | 3/1987 |
| JP | 11-71414 | 3/1999 |
| JP | 2001-2880 | 1/2001 |
| JP | 2002-121217 | 4/2002 |
| JP | 2002-146033 | 5/2002 |
| JP | 2002-155108 | 5/2002 |
| JP | 2003-40928 | 2/2003 |
| JP | 2003-286311 | 10/2003 |

OTHER PUBLICATIONS

Office Action drafted Apr. 16, 2008 in Japanese Application No. JP2006-104627 and English translation thereof.

* cited by examiner

*Primary Examiner*—Helen L. Pezzuto
(74) *Attorney, Agent, or Firm*—Wenderoth, Lind & Ponack, L.L.P.

(57) ABSTRACT

There is disclosed a polyvinylpyrrolidone powder composition including polyvinylpyrrolidone having a K value of not lower than 60 and not higher than 130 and a secondary amine or a salt thereof. The poly-vinylpyrrolidone powder composition is produced by adding a secondary amine or a salt thereof to polyvinylpyrrolidone having a K value of not lower than 60 and not higher than 130, or by heat drying an aqueous solution containing polyvinylpyrrolidone having a K value of not lower than 60 and not higher than 130 and a secondary amine or a salt thereof.

6 Claims, No Drawings

POLYVINYLPYRROLIDONE POWDER COMPOSITION AND ITS PRODUCTION PROCESSES

BACKGROUND OF THE INVENTION

1. Field of the Invention

The present invention relates to a polyvinyl-pyrrolidone powder composition and its production processes.

2. Description of the Related Art

Polyvinylpyrrolidone has been used, as a safe functional polymer, in wide fields, for example, for applications such as cosmetics, medical or agricultural chemical intermediates, food additives, photosensitive electronic materials, and adhesion providing agents, or for various special industrial applications. Polyvinylpyrrolidone is generally produced by polymerizing N-vinyl-2-pyrrolidone in the presence of a metal catalyst using hydroperoxide as a polymerization initiator in an aqueous medium (e.g., see Japanese Unexamined Patent Publications Nos. 62-62804, 11-71414, and 2002-155108). However, when hydroperoxide is used as a polymerization initiator, its high capacity for extracting hydrogen easily promotes graft reaction. Therefore, a remarkable increase in molecular weight may be observed in some cases.

Consequently, when N-vinyl-2-pyrrolidone is polymerized using an azo compound as a polymerization initiator as described in, for example, Synthesis Examples of Japanese Unexamined Patent Publications Nos. 2002-121217 and 2003-286311, a polyvinylpyrrolidone aqueous solution containing polyvinylpyrrolidone having a high K value is obtained. In this case, in order to reduce the amount of unreacted monomer, a polyvalent carboxylic acid such as oxalic acid, malonic acid, or succinic acid is added to the polyvinylpyrrolidone aqueous solution after polymerization. In addition, in order to adjust pH, an organic base such as guanidine carbonate or triethanolamine is added thereto.

However, the present inventors have found that when a polyvinylpyrrolidone aqueous solution containing polyvinylpyrrolidone having a high K value, which has been obtained by the above-described method, is heat dried and then the material obtained is dissolved in water again, it requires comparatively long time. In general, polyvinylpyrrolidone having a high K value has a high molecular weight and high viscosity, and has a low solution rate in water. Therefore, when it is dissolved in water for use, it is accompanied with very difficulty, and workability is remarkably lowered.

SUMMARY OF THE INVENTION

Under the above-described circumstances, the problems to be solved by the present invention are to provide a high quality polyvinylpyrrolidone powder composition having a high solution rate in water, even if it is a powder composition containing polyvinyl-pyrrolidone having a high K value, and to provide a process for producing the powder composition in a simple and easy manner.

The present inventors have variously studied and as a result, have found that polyvinylpyrrolidone having a high K value is rapidly dissolved in water in the presence of a secondary amine or a salt thereof, thereby completing the present invention.

That is, the present invention provides a polyvinylpyrrolidone powder composition comprising polyvinylpyrrolidone having a K value of not lower than 60 and not higher than 130 and a secondary amine or a salt thereof.

The polyvinylpyrrolidone powder composition is produced, for example, by adding a secondary amine or a salt thereof to polyvinylpyrrolidone having a K value of not lower than 60 and not higher than 130.

Alternatively, the polyvinylpyrrolidone powder composition is produced by heat drying a polyvinyl-pyrrolidone aqueous solution containing polyvinyl-pyrrolidone having a K value of not lower than 60 and not higher than 130 and a secondary amine or a salt thereof.

The polyvinylpyrrolidone aqueous solution may preferably be obtained by adding a secondary amine or a salt thereof to a reaction solution before, during, or after the polymerization of N-vinyl-2-pyrrolidone using an azo compound or organic peroxide as a polymerization initiator in an aqueous medium to obtain the polyvinylpyrrolidone aqueous solution, or by adding a secondary amine or a salt thereof to an aqueous solution containing polyvinylpyrrolidone having a K value of not lower than 60 and not higher than 130, or by adding polyvinylpyrrolidone having a K value of not lower than 60 and not higher than 130 to an aqueous solution of a secondary amine or a salt thereof.

The polyvinylpyrrolidone powder composition of the present invention has a high solution rate in water, even if it is a powder composition containing polyvinylpyrrolidone having a high K value. Further, according to the production process of the present invention, such a high quality polyvinylpyrrolidone powder composition can be obtained in a simple and easy manner.

DETAILED DESCRIPTION OF THE INVENTION

<<Polyvinylpyrrolidone Powder Composition>>

The polyvinylpyrrolidone powder composition of the present invention is characterized in containing polyvinylpyrrolidone having a K value of not lower than 60 and not higher than 130 and a secondary amine or a salt thereof. The wording "polyvinylpyrrolidone powder composition" is not particularly limited to polyvinylpyrrolidone powder, but means, in the broad sense, a composition containing the solid matter of polyvinylpyrrolidone. The solid matter may preferably be polyvinyl pyrrolidone powder, but may be in any shape, for example, in particle shape, in granule shape, in spherical shape, in bulk shape, in scale shape, or in amorphous shape. The size of particles and the like constituting the solid matter may appropriately be adjusted depending upon the applications, although it is not particularly limited.

Further, the "K value" is a numerical value generally used as the basis of molecular weight in case of polyvinylpyrrolidone, and specifically a numerical value obtained by multiplying 1,000 by a value $K_0$ which is obtained by measuring the relative viscosity of 1 wt % polyvinylpyrrolidone aqueous solution with a capillary viscometer at 25° C. and substituting it in the Fikentscher's viscosity equation:

$$\log_{10}\eta_{rel}=[75k_0^2/(1+1.5k_0c)+k_0]c$$

wherein $\eta_{rel}$ represents relative viscosity, c represents the concentration (g/100 mL) of the aqueous solution, that is, the gram number of polyvinylpyrrolidone contained in 100 mL of the aqueous solution, and $k_0$ represents a variable number related to a K value (the method of determining the K value may be called below in some cases as the "Fikentscher's method"). Larger K values indicate higher molecular weights.

Further, the wording "polyvinylpyrrolidone" means the homopolymer of N-vinyl-2-pyrrolidone. When its molecular weight is represented by the K value according to the above-described Fikentscher's method, it is not lower than 60 and not higher than 130, preferably not lower than 65 and not higher than 125, more preferably not lower than 70 and not higher than 120, and still more preferably not lower than 75 and not higher than 100.

The polyvinylpyrrolidone is obtained by polymerizing N-vinyl-2-pyrrolidone, and its method may be any one of the heretofore known methods, but a method of using an azo compound or organic peroxide as a polymerization initiator in an aqueous medium may particularly be preferred.

The polyvinylpyrrolidone powder composition of the present invention contains a secondary amine or a salt thereof in addition to polyvinylpyrrolidone. The wording "secondary amine or a salt thereof" means at least one of the secondary amine or a salt thereof. That is, the polyvinylpyrrolidone powder composition of the present invention may contain either of the secondary amine or a salt thereof, or both of the secondary amine and a salt thereof.

Further, the wording "secondary amine" means a compound in which two hydrogen atoms of ammonia are substituted with two substituted or unsubstituted hydrocarbon groups (including such a case that the hydrocarbon groups are bonded to each other as described later to form a nitrogen-containing heterocyclic ring). The two hydrocarbon groups may be the same or different, and each of them may be selected independently from aliphatic hydrocarbon groups, alicyclic hydrocarbon groups, and aromatic hydrocarbon groups, or may be bonded to each other form a nitrogen-containing heterocyclic ring together with an adjacent nitrogen atom or, in some cases, together with any other hetero atom selected from nitrogen, oxygen, and sulfur.

Examples of the aliphatic hydrocarbon groups include alkyl groups having 1 to 4 carbon atoms and alkenyl groups having 2 or 3 carbon atoms, specific examples of which include a methyl group, an ethyl group, a propyl group, an isopropyl group, a butyl group, an isobutyl group, a sec-butyl group, a tert-butyl group, a vinyl group, an allyl group, and an isopropenyl group.

Examples of the alicyclic hydrocarbon groups include cycloalkyl groups having 5 or 6 carbon atoms, specific examples of which include a cyclopentyl group and a cyclohexyl group.

Examples of the aromatic hydrocarbon groups include aryl groups having 6 to 8 carbon atoms and aralkyl groups having 7 or 8 carbon atoms, specific examples of which include a phenyl group, a tolyl group, a xylyl group, a benzyl group, and a phenethyl group.

Examples of the nitrogen-containing heterocyclic rings include heterocyclic rings containing 1 or 2 nitrogen atoms, specific examples of which include a pyrrolidine ring, a piperidine ring, a piperazine ring, a morpholine ring, and a thiomorpholine ring.

When the hydrocarbon group has a substituent, examples of the substituent include a hydrocarbon group (e.g., $CH_3$—, $CH_3CH_2$—, and $C_6H_5$—), a halogen group (e.g., F—, Cl—, Br—, and I—), a hydroxy group (HO—), a carbonyl group (—CO—), an ether group (e.g., $CH_3O$—, $CH_3CH_2O$—, and $C_6H_5O$—), a carboxyl group (—COOH), an ester group (e.g., —$COOCH_3$, —$COOC_2H_5$, $CH_3COO$—, and $C_6H_5COO$—), an acyl group (e.g., —CHO, $CH_3CO$—, and $C_6H_5CO$—), a sulfanyl group (HS—), a sulfo group (—$SO_3H$), a sulfamoyl group ($H_2N$—$SO_2$—), an amino group ($H_2N$—), a cyano group (—CN), and a nitro group (—$NO_2$). The hydrocarbon group may have any of these substituents alone or may also have two or more kinds of these substituents in combination.

Specific examples of the secondary amine include secondary aliphatic amines such as dimethylamine, diethylamine, dipropylamine, diisopropylamine, N-methlethylamine, N-methylpropylamine, N-methyl-isopropylamine, N-methylbutylamine, N-methyl-isobutylamine, N-methylcyclohexylamine, N-ethyl-propylamine, N-ethylisopropylamine, N-ethylbutyl-amine, N-ethylisobutylamine, N-ethylcyclohexylamine, N-methylvinylamine, and N-methylallylamine; aliphatic diamines and triamines, such as N-methylethylenediamine, N-ethylethylenediamine, N,N'-dimethyl-ethylenediamine, N,N'-diethylethylenediamine, N-methyltrimethylenediamine, N-ethyltrimethylene-diamine, N,N'-dimethyltrimethylenediamine, N,N'-diethyltrimethylenediamine, diethylenetriamine, and dipropylenetriamine; aromatic amines such as N-methylbenzylamine, N-ethylbenzylamine, N-methyl-phenethylamine, and N-ethylphenethylamine; monoalkanolamines such as N-methylethanolamine, N-ethylethanolamine, N-propylethanolamine, N-isopropylethanolamine, N-butylethanolamine, and N-isobutylethanolamine; dialkanolamines such as diethanolamine, dipropanolamine, diisopropanolamine, and dibutanolamine; cyclic amines such as pyrrolidine, piperidine, piperazine, N-methylpiperazine, N-ethylpiperazine, morpholine, and thiomorpholine. These secondary amines may be used alone or two or more kinds of them may also be used in combination. In these secondary amines, dialkanolamine and dialkylamine may be preferred, dialkanolamine may be more preferred, and diethanolamine may particularly be preferred.

Further, the wording "a salt thereof" in the wording "secondary amine or a salt thereof" means a salt of an acid, which is produced by the reaction of the secondary amine with the acid. Specific example thereof include inorganic acid salts such as hydrochloride salts, hydrobromide salts, sulfates, and carbonates; and organic acid salts such as oxalates, malonates, and succinates. These salts may be used alone or two or more kinds of these salts may also be used in combination. In these salts, malonates may particularly be preferred. Further, as described later, when an organic acid is used to reduce the amount of unreacted monomer after N-vinyl-2-pyrrolidone is polymerized, the secondary amine, even if added, may form a salt with the organic acid in the polyvinylpyrrolidone powder composition of the present invention.

The secondary amine or a salt thereof may be added to, for example, the solid matter or aqueous solution of polyvinylpyrrolidone. When it is added to a polyvinylpyrrolidone aqueous solution, it may be added to a reaction solution before, during, or after the polymerization of N-vinyl-2-pyrrolidone to obtain the polyvinylpyrrolidone aqueous solution, or may be added to an aqueous solution of polyvinylpyrrolidone separately prepared. The wording "before, during, or after polymerization" means at least one stage selected from among before, during, or after polymerization. Alternatively, polyvinylpyrrolidone may be added to an aqueous solution of a secondary amine or a salt thereof. In either case, the content of the secondary amine or a salt thereof in the polyvinylpyrrolidone powder composition of the present invention finally obtained may preferably be not lower than 500 ppm and not higher than 10,000 ppm, more preferably not lower than 800 ppm and not higher than 6,000 ppm, and still more preferably not lower than 1,000 ppm and not higher than 4,000 ppm. Further, the content of the secondary amine or a salt thereof can be determined by preparing an aqueous solution of the polyvinylpyrrolidone powder composition, measuring the content of the secondary amine or a salt thereof present in the aqueous solution using an ion chromatography apparatus (e.g., ICS-2000 available from Japan Dionex Co., Ltd.; it uses Ion Pac AS-15 as a column) and then calculating the relative content of the secondary amine or a salt thereof to the content of polyvinylpyrrolidone.

The polyvinylpyrrolidone powder composition of the present invention has excellent solubility because it has a high solution rate in water and is rapidly dissolved in water. Further, when the polyvinyl-pyrrolidone powder composition of the present invention is dissolved in water and filtered, or when a solid matter obtained by heat drying after dissolution in water is dissolved in water again and filtered, insoluble matter may remain at 500 ppm or lower. Such a case is, however, also included within the scope of the present invention considering it as substantially not producing insoluble matter.

The polyvinylpyrrolidone powder composition of the present invention may be used, without any further treatment, for applications such as cosmetics, medical and agricultural chemical intermediates, food additives, photosensitive electronic materials, and adhesion providing agents, or for various special industrial applications (e.g., the production of hollow fiber membranes). In addition, when it is dissolved in water to form an aqueous solution, it may be used by dilution or concentration, or may be used by heat drying it to be changed to the form of solid matter.

<<Processes for Producing Polyvinylpyrrolidone Powder Composition>>

The polyvinylpyrrolidone powder composition of the present invention can be produced, for example, by adding a secondary amine or a salt thereof to polyvinylpyrrolidone having a K value of not lower than 60 and not higher than 130. The polyvinylpyrrolidone having a K value of not lower than 60 and not higher than 130 can be obtained by the polymerization of N-vinyl-2-pyrrolidone using any of the heretofore known polymerization methods. However, when hydrogen peroxide is used as a polymerization initiator, its high capacity for extracting hydrogen easily promotes graft reaction. Accordingly, a remarkable increase of molecular weight may be observed in some cases. Therefore, for example, an azo compound or organic peroxide may preferably be used. Further, the aqueous solution of polyvinylpyrrolidone obtained is heat dried and then a specific amount of the secondary amine or a salt thereof is added thereto to obtain the polyvinylpyrrolidone powder composition of the present invention.

Alternatively, the polyvinylpyrrolidone powder composition of the present invention can be produced by heat drying an aqueous solution of polyvinyl-pyrrolidone containing polyvinylpyrrolidone having a K value of not lower than 60 and not higher than 130 and a secondary amine or a salt thereof.

The polyvinylpyrrolidone aqueous solution may preferably be obtained by adding a secondary amine or a salt thereof to a reaction solution before, during, or after the polymerization of N-vinyl-2-pyrrolidone using an azo compound or organic peroxide as a polymerization initiator in an aqueous medium to obtain the polyvinylpyrrolidone aqueous solution, by adding a secondary amine or a salt thereof to an aqueous solution containing polyvinylpyrrolidone having a K value of not lower than 60 and not higher than 130, or by adding polyvinylpyrrolidone having a K value of not lower than 60 and not higher than 130 to an aqueous solution of a secondary amine or a salt thereof.

As the method of heat drying the aqueous solution of polyvinylpyrrolidone, there may be employed any of the heretofore known methods, although it is not particularly limited. Examples thereof include a spray drier drying method and a drum drier method. The conditions such as temperature and time of drying may appropriately be adjusted depending upon the amount of the aqueous solution of polyvinylpyrrolidone to be dried, although it is not particularly limited. For example, it may be dried at a temperature of preferably not lower than 100° C. and not higher than 160° C., more preferably not lower than 100° C. and not higher than 150° C., and preferably within one hour, more preferably within 30 minutes, and still more preferably within 10 minutes.

As the method of obtaining an aqueous solution of polyvinylpyrrolidone by the polymerization of N-vinyl-2-pyrrolidone, there may be employed any of the heretofore known methods, although it is not particularly limited. However, as described above, when hydrogen peroxide is used as a polymerization initiator, its high capacity for extracting hydrogen easily promotes graft reaction. Accordingly, a remarkable increase of molecular weight may be observed in some cases. Therefore, for example, an azo compound or organic peroxide may preferably be used. The wording "azo compound or organic peroxide" means at least one of the azo compound or organic peroxide. That is, either of the azo compound or organic peroxide, or both of them, may be used as the polymerization initiator.

Examples of the azo compound which can be used as the polymerization initiator include 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(isobutyrate), 4,4'-azobis(4-cyanovaleric acid), 2,2'-azobis(2-methylpropionamidine) dihydrochloride, 2,2'-azobis[N-(2-carboxyethyl)-2-methylpropionamidine]n hydrate, 2,2'-azobis[2-(2-imidazolin-2-yl) propane]dihydrochloride, 2,2'-azobis[2-(2-imidazolin-2-yl) propane]disulfate dihydrate, and 1,1'-azobis(cyclohexane-1-carbonitrile). These azo compounds may be used alone or two or more kinds of these azo compounds may also be used in combination. In these azo compounds, 2,2'-azobis(2-methylbutyronitrile) and dimethyl 2,2'-azobis(isobutyrate) may particularly be preferred.

Examples of the organic peroxide which can be used as the polymerization initiator include benzoyl peroxide, dicumyl peroxide, 2,5-dimethyl-2,5-di-(tert-butylperoxy)hexane, 1,1'-di(tert-butyl-peroxy)-3,3,5-trimethylenecyclohexane, 1,3-di(tert-butylperoxy)diisopropylbenzene, di(tert-butylperoxide), tert-butyl hydroperoxide, tert-butyl peroxy-2-ethylhexanoate, tert-butyl peroxypivalate, tert-amyl peroxy-2-ethylhexanoate, and tert-amyl hydroperoxide. These organic peroxides may be used alone or two or more kinds of these organic peroxides may also be used in combination. In these organic peroxides, tert-butyl hydroperoxide and tert-amyl peroxy-2-ethylhexanoate may be preferred and tert-amyl peroxy-2-ethylhexanoate may particularly be preferred.

The concentration of the polymerization initiator in the polymerization reaction may appropriately be adjusted depending upon the use amount of the monomer component, although it is not particularly limited, but for example, may preferably be not smaller than 0.001 parts by mass and not greater than 3 parts by mass, more preferably not smaller than 0.005 parts by mass and not greater than 2 parts by mass, and still more preferably not smaller than 0.01 parts by mass and not greater than 1 part by mass, relative to 100 parts by mass of the monomer. When polymerization reaction is carried out, an arbitrary chain transfer agent, a pH adjusting agent, a buffer, and the like can be used in addition to the polymerization initiator, if necessary.

The polymerization of N-vinyl-2-pyrrolidone may preferably be carried out in an aqueous medium. The wording "aqueous medium" means water or a mixed solvent of water and a lower alcohol(s). Examples of the lower alcohol include methyl alcohol, ethyl alcohol, isopropyl alcohol, and diethylene glycol.

The reaction temperature in the polymerization reaction may appropriately be set depending upon conditions such as reaction raw materials, but may preferably be not lower than 40° C. and not higher than 100° C., more preferably not lower than 50° C. and not higher than 95° C., and still more preferably not lower than 60° C. and not higher than 90° C.

After the polymerization, an organic acid may be added to the reaction solution in order to reduce the amount of unreacted monomer. The organic acid which can be used may preferably be polyvalent carboxylic acids, specific examples of which include oxalic acid, malonic acid, succinic acid, asparatic acid, citric acid, glutamic acid, fumaric acid, malic acid, maleic acid, phthalic acid, trimellitic acid, and pyromellitic acid, but it may more preferably be organic acids which are polyvalent carboxylic acids and in which the first dissociation constant of carboxylic groups is 3.0 or lower and the solubility into water at 20° C. of its calcium salt is 0.1% by mass or higher. Specific examples thereof include malonic acid, ethylmalonic acid, ethylmethylmalonic acid, and ethylpropylmalonic acid. These organic acids may be used alone or two or more kinds of these organic acids may also be used in combination. In these organic acids, malonic acid may particularly be preferred.

The reason why the organic acid meeting the above-described conditions may preferably be used is that even if the polyvinylpyrrolidone powder composition obtained is dissolved in hard water containing great amounts of calcium ion and/or magnesium ion, a transparent clear aqueous solution can be obtained, and further, a lowering of molecular weight at the time of storage can be suppressed, so that quality can be stabilized.

The use amount of the organic acid may appropriately be adjusted depending upon the use amount of the monomer, although it is not particularly limited, but for example, it may be used so that the pH of the reaction solution may preferably become not higher than 5, and more preferably not lower than 3 and not higher than 4. Specifically, the use amount of the organic acid may preferably be not smaller than 100 ppm and not greater than 10,000 ppm, and more preferably not smaller than 500 ppm and not greater than 5,000 ppm, relative to the use amount of the monomer. When the organic acid is added after the polymerization reaction, the polyvinylpyrrolidone powder composition of the present invention contains the organic acid in a content according to the above-described use amount. However, the organic acid may form, in some cases, a salt with the secondary amine as described above. In such a case, the polyvinylpyrrolidone powder composition of the present invention comes to contain a salt of the organic acid with the secondary amine in a content according to the above-described use amount.

Further, when the amount of unreacted monomer is reduced using the organic acid, the residual amount of the monomer in the polyvinylpyrrolidone aqueous solution finally obtained may preferably be 10 ppm or lower, more preferably 8 ppm or lower, and still more preferably 6 ppm or lower, relative to polyvinyl-pyrrolidone. The residual amount of the monomer can be determined by measuring the amount of N-vinyl-2-pyrrolidone remaining in the polyvinylpyrrolidone aqueous solution using liquid chromatography with an absorption wavelength of 235 nm and calculating the relative residual amount of N-vinyl-2-pyrrolidone to the content of polyvinylpyrrolidone.

After the unreacted monomer is reduced, the pH of the reaction solution may be adjusted, for example, by adding a base. As the base which can be used, an organic base in which ash does not remain even after heat drying may be preferred. In particular, guanidine carbonate, triethanolamine, dihydazide adipate, and the like may particularly be preferred because pH can easily be adjusted and a powder composition with less coloration and stable quality can be obtained. These organic bases may be used alone or two or more kinds of these organic bases may also be used in combination.

The use amount of the base may appropriately be adjusted depending upon the use amount of the organic acid, although it is not particularly limited, but for example, it may be used so that the pH of the reaction solution may preferably become not lower than 3 and not higher than 9, more preferably not lower than 3 and not higher than 8, and still more preferably not lower than 4 and not higher than 7. Specifically, the use amount of the base may preferably be not smaller than 100 ppm and not greater than 10,000 ppm, and more preferably not smaller than 500 ppm and not greater than 5,000 ppm, relative to the use amount of the monomer. Even if a base is added after the amount of unreacted monomer is reduced, the polyvinylpyrrolidone powder composition of the present invention contains substantially no organic base when an organic base in which ash does not remain even after heat drying is used.

When N-vinyl-2-pyrrolidone is polymerized by the above-described method, polyvinylpyrrolidone is obtained in the form of an aqueous solution. As described above, the polyvinylpyrrolidone aqueous solution may be converted to the polyvinylpyrrolidone powder composition by heat drying with any of the heretofore known methods, without any further treatment when a secondary amine or a salt thereof is added to the reaction solution before, during, or after polymerization, or after further adding a secondary amine or a salt thereof.

When a secondary amine or a salt thereof is not added in the polymerization, the polyvinylpyrrolidone powder composition is prepared by adding a secondary amine or a salt thereof to the polyvinylpyrrolidone aqueous solution obtained, or to the polyvinyl-pyrrolidone aqueous solution obtained by preparing a solid matter by heat drying it with any of the heretofore known methods and dissolving the solid matter in water again, and then by heat drying it with any of the heretofore known methods. Alternatively, the polyvinylpyrrolidone powder composition may be prepared by heat drying, with any of the heretofore known methods, the polyvinylpyrrolidone aqueous solution obtained by polymerization to obtain a solid matter, adding the solid matter to an aqueous solution of a secondary amine or a salt thereof, and then heat drying it with any of the heretofore known methods.

As a matter of course, as the polyvinylpyrrolidone having a K value of not lower than 60 and not higher than 130, a product separately purchased may be used without carrying out oneself polymerization. In this case, if the product is an aqueous solution, the polyvinylpyrrolidone powder composition can be prepared by heat drying it with any of the heretofore known methods and then adding a secondary amine or a salt thereof to the solid matter obtained, or by adding a secondary amine or a salt thereof to the aqueous solution and then heat drying it with any of the heretofore known methods. When the product is a solid matter, the polyvinylpyrrolidone powder composition may be prepared by adding a secondary amine or a salt thereof to the solid matter. Alternatively, the polyvinylpyrrolidone powder composition may be prepared by adding a secondary amine or a salt thereof to the polyvinylpyrrolidone aqueous solution obtained by dissolving the solid matter in water again, and then heat drying it with any of the heretofore known methods.

Alternatively, the polyvinylpyrrolidone powder composition may be prepared by adding the solid matter in an aqueous solution of a secondary amine or a salt thereof and then heat drying it with any of the heretofore known methods.

In any of the above-described processes, it may be preferred that when the polyvinylpyrrolidone aqueous solution is treated, insoluble matter is removed as much as possible, for example, by filtration, decantation, or the like, at an appropriate stage.

According to the production processes of the present invention, a secondary amine is only added at an appropriate stage, so that a high quality polyvinylpyrrolidone powder composition containing polyvinylpyrrolidone having a high K value in the form of a solid matter can easily be prepared.

EXAMPLES

The present invention will be described below in more detail by way of Examples, but the present invention is not limited to the following Examples. The present invention can be put into practice after appropriate modifications or variations within a range meeting the gists described above and later, all of which are included in the technical scope of the present invention. Further, "parts by mass" and "% by mass" may be represented below in some cases as "parts" and "wt %", respectively, for convenience.

First, a method of measuring the K value of polyvinylpyrrolidone and a method of evaluating a polyvinylpyrrolidone powder composition will be described.

<K Value>

The polyvinylpyrrolidone aqueous solution obtained was diluted with water so as to have a concentration of 1 wt %, the relative viscosity of the diluted solution was measured at 25° C. with a capillary viscometer, and the K value was determined using the above-described Fikentscher's viscosity equation. Larger numerical values indicate higher molecular weights.

<Solution Rate>

To 10 parts of a polyvinylpyrrolidone powder composition with a solid content of 95% or higher, there were added, with stirring, 40 parts of water in Example 1 and Comparative Example 1 or 90 parts of water in Example 2 and Comparative Example 2, and time required for their substantially completely dissolving was measured. Lower numerical values indicate higher solubilities.

Example 1

A reaction vessel was charged with 1,518 parts of water, into which nitrogen gas was introduced, and the reaction vessel was heated with stirring so that the inner temperature of the reaction vessel became 76° C. To the reaction vessel, there were added dropwise 402 parts of N-vinyl-2-pyrrolidone and a mixture of 0.8 parts of dimethyl 2,2'-azobis(isobutyrate), 20 parts of isopropyl alcohol, and 60 parts of water, respectively, over 2 hours, to carry out reaction. After completion of the dropwise addition, the inner temperature of the reaction vessel was raised to 80° C., and the reaction was carried out for 5 hours. Then, an aqueous solution containing 0.72 parts of malonic acid (the first dissociation constant is 2.8, and the solubility of its calcium salt at 20° C. is 0.36% by mass) dissolved in 1.7 parts of water was added to the reaction vessel, and the reaction was carried out for 2 hours. Further, an aqueous solution containing 0.94 parts of guanidine carbonate dissolved in 3.8 parts of water was added to the reaction vessel, followed by stirring for 1 hour, and 1.14 parts of diethanolamine as a secondary amine was added to the reaction vessel, followed by stirring for 30 minutes, to obtain a polyvinylpyrrolidone aqueous solution. The polyvinylpyrrolidone aqueous solution obtained was measured for physical properties, and it was found that the concentration was 20 wt %, the K value was 79, and the residual amount of N-vinyl-2-pyrrolidone was 4 ppm, relative to polyvinylpyrrolidone. The polyvinylpyrrolidone aqueous solution obtained was dried at 120° C. by a drum drier drying method, followed by pulverization, to obtain a polyvinylpyrrolidone powder composition having a solid content of 96.4 wt % and containing 2,800 ppm of diethanolamine or a salt thereof. The polyvinylpyrrolidone powder composition obtained was measured for solution rate, and it was found that the solution rate was 11 minutes, showing high solubility.

Example 2

A polyvinylpyrrolidone aqueous solution was obtained in the same manner as described in Example 1, except that 0.8 parts of dimethyl 2,2'-azobis-(isobutyrate) was changed to 0.2 parts of dimethyl 2,2'-azobis(isobutyrate). The polyvinylpyrrolidone aqueous solution obtained was measured for physical properties, and it was found that the concentration was 20 wt %, the K value was 95, and the residual amount of N-vinyl-2-pyrrolidone was 1 ppm or lower, relative to polyvinylpyrrolidone. The polyvinylpyrrolidone aqueous solution obtained was dried at 120° C. by a drum drier drying method, followed by pulverization, to obtain a polyvinylpyrrolidone powder composition having a solid content of 96.0 wt % and containing 2,800 ppm of diethanolamine or a salt thereof. The polyvinylpyrrolidone powder composition obtained was measured for solution rate, and it was found that the solution rate was 12 minutes, showing high solubility.

Comparative Example 1

A polyvinylpyrrolidone aqueous solution was obtained in the same manner as described in Example 1, except that triethanolamine as a tertiary amine was used in place of diethanolamine. The polyvinylpyrrolidone aqueous solution obtained was measured for physical properties, and it was found that the concentration was 20 wt %, the K value was 79, and the residual amount of N-vinyl-2-pyrrolidone was 3 ppm, relative to polyvinylpyrrolidone. The polyvinylpyrrolidone aqueous solution obtained was dried at 120° C. by a drum drier drying method, followed by pulverization, to obtain a polyvinylpyrrolidone powder composition. The polyvinylpyrrolidone powder composition obtained was measured for solution rate, and it was found that the solution rate was 18 minutes, showing considerably low solubility.

Comparative Example 2

A reaction vessel was charged with 1,518 parts of water, into which nitrogen gas was introduced, and the reaction vessel was heated with stirring so that the inner temperature of the reaction vessel became 76° C. To the reaction vessel, there were added dropwise 402 parts of N-vinyl-2-pyrrolidone and a mixture of 0.2 parts of 2,2'-azobis(2-methylbutyronitrile), 20 parts of isopropyl alcohol, and 60 parts of water, respectively, over 4 hours, to carry out reaction. After completion of the dropwise addition, the inner temperature of the reaction vessel was raised to 80° C., and the reaction was carried out for 5 hours. Then, an aqueous solution containing 0.72 parts of malonic acid (the first dissociation constant is 2.8, and the solubility of its calcium salt at 20° C. is 0.36% by mass) dissolved in 1.7 parts of water was added, and the reaction was carried out for 2 hours. Further, an aqueous solution containing 0.94 parts of guanidine carbonate dissolved in 3.8 parts of water was added, followed by stirring for 1 hour, and 1.14 parts of monomethanolamine as a primary amine and 1.14 parts of triethanolamine as a tertiary amine were added to the reaction vessel, followed by stirring for 30 minutes, to obtain a polyvinylpyrrolidone aqueous solution. The polyvinylpyrrolidone aqueous solution obtained was measured for physical properties, and it was found that the concentration was 20 wt %, the K value was 95, and the residual amount of N-vinyl-2-pyrrolidone was 1 ppm or lower, relative to polyvinylpyrrolidone. The polyvinylpyrrolidone aqueous solution obtained was dried at 120° C. by a drum drier drying method, followed by pulverization, to obtain a polyvinylpyrrolidone powder composition having a solid content of 95.4 wt %. The polyvinylpyrrolidone powder composition obtained was measured for solution rate, and it was found that the solution rate was 16 minutes, showing considerably low solubility.

The polyvinylpyrrolidone powder composition of the present invention can be used as a raw material or an additive, without any further treatment, in wide fields, for example, for applications such as cosmetics, medical and agricultural chemical intermediates, food additives, photosensitive electronic materials, and adhesion providing agents, or for various special industrial applications (e.g., the production of hollow fiber membranes). In addition, the polyvinyl-pyrrolidone powder composition of the present invention is industrially advantageous because it has a high solution rate to improve working efficiency when used.

The invention claimed is:

1. A polyvinylpyrrolidone powder composition comprising polyvinylpyrrolidone homopolymer having a K value of not lower than 60 and not higher than 130 and diethanolamine or a salt thereof.

2. A process for producing a polyvinylpyrrolidone powder composition according to claim 1, comprising adding diethanolamine or a salt thereof to polyvinylpyrrolidone homopolymer having a K value of not lower than 60 and not higher than 130.

3. A process for producing a polyvinylpyrrolidone powder composition according to claim 1, comprising heat drying a polyvinylpyrrolidone aqueous solution containing polyvinylpyrrolidone homopolymer having a K value of not lower than 60 and not higher than 130 and diethanolamine or a salt thereof.

4. The process according to claim 3, wherein the polyvinylpyrrolidone aqueous solution according to claim 3 is obtained by adding diethanolamine or a salt thereof to a reaction solution before, during, or after polymerization of N-vinyl-2-pyrrolidone using an azo compound or organic peroxide as a polymerization initiator in an aqueous medium to obtain the polyvinylpyrrolidone aqueous solution.

5. The process according to claim 3, wherein the polyvinylpyrrolidone aqueous solution according to claim 3 is obtained by adding diethanolamine or a salt thereof to an aqueous solution containing polyvinylpyrrolidone homopolymer having a K value of not lower than 60 and not higher than 130.

6. The process according to claim 3, wherein the polyvinylpyrrolidone aqueous solution according to claim 3 is obtained by adding polyvinylpyrrolidone homopolymer having a K value of not lower than 60 and not higher than 130 to an aqueous solution of diethanolamine or a salt thereof.

* * * * *